United States Patent
Abukawa et al.

[11] Patent Number: 5,089,737
[45] Date of Patent: Feb. 18, 1992

[54] DC ROTARY ELECTRIC MACHINE OF PERMANENT MAGNET FIELD TYPE

[75] Inventors: Toshimi Abukawa, Hitachiota; Kazuo Tahara; Noriyoshi Takahashi, both of Hitachi; Toshio Tomite, Katsuta, all of Japan

[73] Assignee: Hitachi, Ltd., Tokyo, Japan

[21] Appl. No.: 342,304

[22] Filed: Apr. 24, 1989

[30] Foreign Application Priority Data

Apr. 25, 1988 [JP] Japan ............... 63-100352

[51] Int. Cl.$^5$ .............. H02K 23/04; H02K 21/28; H02K 1/10
[52] U.S. Cl. .................. 310/154; 310/186; 310/190
[58] Field of Search .......... 310/154, 186, 188, 190, 310/193, 254

[56] References Cited

U.S. PATENT DOCUMENTS

| | | | |
|---|---|---|---|
| 3,567,979 | 3/1971 | Jaffe | 310/154 |
| 3,889,141 | 6/1975 | Merriam | 310/154 |
| 4,217,513 | 8/1980 | Kohzai et al. | 310/186 |
| 4,296,343 | 10/1981 | McMillen | 310/186 |
| 4,469,969 | 9/1984 | Tomite | 310/154 |
| 4,516,046 | 5/1985 | Mercier | 310/186 |
| 4,587,449 | 5/1986 | West | 310/154 |
| 4,794,291 | 12/1988 | Abukawa et al. | 310/185 |
| 4,797,592 | 1/1989 | England | 310/254 |
| 4,823,037 | 4/1989 | Abukawa et al. | 310/185 |

FOREIGN PATENT DOCUMENTS

| | | |
|---|---|---|
| 0060555 | 9/1982 | European Pat. Off. |
| 1071214 | 12/1958 | Fed. Rep. of Germany |
| 2269229 | 4/1975 | France |
| 153558 | 9/1982 | Japan |
| 110023 | 1/1984 | Japan |

Primary Examiner—R. Skudy
Assistant Examiner—C. LaBalle
Attorney, Agent, or Firm—Antonelli, Terry, Stouth & Kraus

[57] ABSTRACT

A novel DC rotary electric machine of permanent magnet field type is disclosed, in which a plurality of permanent field magnets having an auxiliary pole of magnetic material are arranged alternately with a plurality of field magnets including only a magnetic material along the peripheral direction. The field magnets with the auxiliary poles are arranged adjacently with the field magnets of magnetic material with through bolts extending therebetween.

2 Claims, 6 Drawing Sheets

DC ROTARY ELECTRIC MACHINE OF PERMANENT MAGNET FIELD TYPE

BACKGROUND OF THE INVENTION

The present invention relates to a DC rotary electric machine of permanent magnet field type, or more in particular to a structure of the field magnets with an improved stator.

In the conventional DC rotary electric machines of permanent magnet field type, as disclosed in JP-A-57-153558, as many field magnets as the magnetic poles of a rotary electric machine are arranged on the inner periphery of the stator, and each of the field magnets includes a permanent magnet and an auxiliary magnetic pole of a magnetic material such as mild steel juxtaposed with the permanent magnet.

The conventional DC rotary electric machine of permanent magnet field type, however, with a permanent magnet arranged with each of the four magnetic poles, develops a great amount of magnetic flux at the permanent magnets under a no load, thereby resulting in a low no-load speed of rotation. Further, since each permanent magnet is made of a rare earth material such as samarium, cobalt or Nd-Fe-B, the great amount of material required leads to a high cost of the field magnets. In addition, when assembly bolts are passed through the space between adjacent magnetic poles for assembly work, each bolt, being of a magnetic material, is attracted to the permanent magnets, thereby making the assembly work inconvenient.

SUMMARY OF THE INVENTION

Accordingly, an object of the present invention is to solve the problems of the prior art mentioned above and to greatly reduce the amount of magnetic flux generated at the permanent magnets under no load.

Another object of the present invention is to produce a low-cost magnetic pole by reducing the amount of permanent magnets used.

Still another object of the invention is to provide a motor which is easy to assemble.

According to the present invention, there is provided a DC rotary electric machine of permanent magnet field type, comprising a yoke, a stator including a number 2a of field magnets fixed on the inner periphery of the yoke, a rotor mounted rotatably within the stator and including an armature core arranged in opposition to the field magnets and an armature coil arranged in the vicinity of the outer periphery of the armature core, and commutation means for supplying a current to the rotor, wherein each of a number a of the 2a field magnets of the stator includes a permanent magnet and an auxiliary magnetic pole of a magnetic material, and each of the other a field magnets includes only an auxiliary pole made of a magnetic material.

In a DC rotary electric machine of permanent magnet field type according to the present invention, a permanent magnet for generating field magnetic fluxes is provided only on a number a of 2a field magnets arranged on the inner periphery of the stator, while the remaining number a of magnetic poles include only an auxiliary magnetic pole of a magnetic material, and therefore the amount of magnetic flux generated for each magnetic pole under no load is reduced to about one half of the amount generated in conventional rotary electric machines of similar type. In starting the rotary electric machine when a large armature current flows, on the other hand, a great amount of magnetic flux is generated by an armature reaction at the field magnets comprised of only an auxiliary magnetic pole, and therefore an average amount of magnetic flux per magnetic pole resulting from the magnetic flux generated on both sides is considerable. In a DC rotary electric machine of permanent magnet field type according to the present invention, the amount of magnetic flux generated under no load with a small armature current is small, while a great amount of magnetic flux is generated at the time of starting when a large armature current flows or under a heavy load, thereby leading to a superior characteristic with a great starting torque and high rotational speed in the absence of load.

DESCRIPTION OF THE PREFERRED EMBODIMENTS

Figure 1:
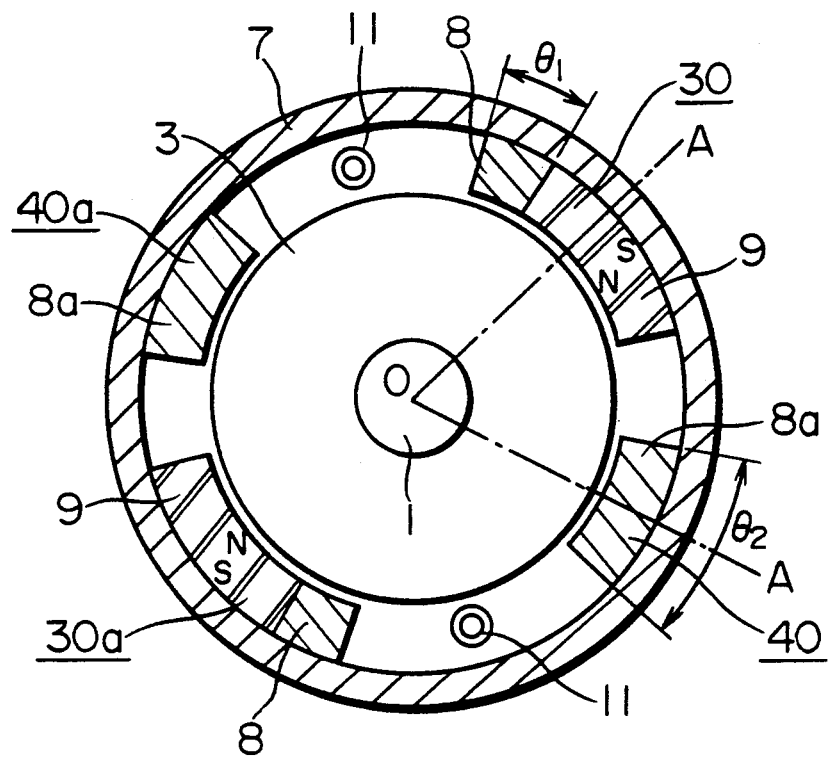
FIG. 1 is a radial sectional view of a motor of permanent magnet field type with auxiliary magnetic poles according to an embodiment of the present invention.
Figure 2:
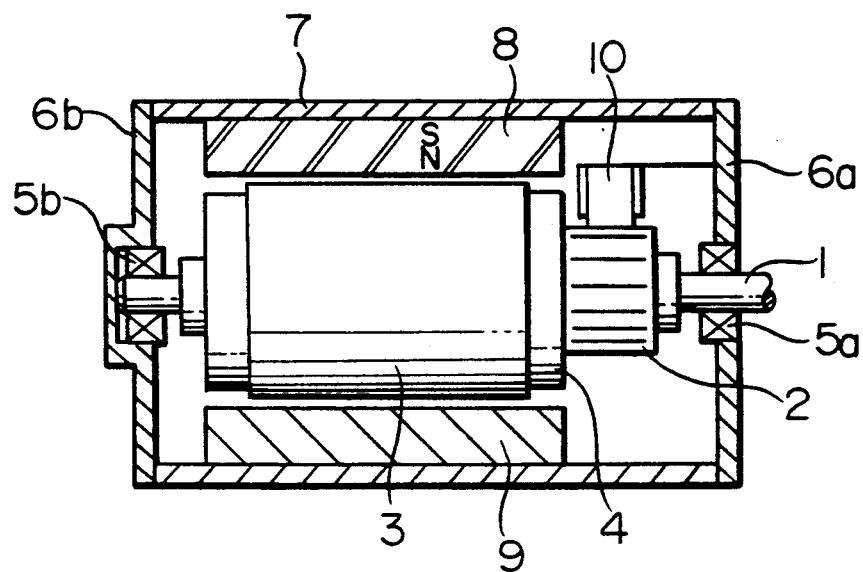
FIG. 2 is an axial sectional view taken along line A-O-A' in FIG. 1.

An embodiment of the present invention will be explained below with reference to the accompanying drawings. FIG. 1 is a radial sectional view of a four-pole DC electric machine of permanent magnet field type with auxiliary magnetic poles, and FIG. 2 an axial sectional view taken along line A-O-A' in FIG. 1. In FIGS. 1 and 2, a rotor including a shaft 1, a commutator 2, an armature core 3 and an armature coil 4 wound thereon is supported on end brackets 6a, 6b on the fixed side through bearings 5a, 5b. The end brackets 6a, 6b are fitted in a cylindrical yoke 7. In a four-pole machine according to an embodiment of the present invention, the field magnets number four. The field magnets of a pair of opposed magnetic poles 30 and 30a have the auxiliary poles 8 of a magnetic material such a mild steel fixed on the yoke 7 for exerting magnetization against armature reaction at the peripheral angle of $\theta_1$. A pair of permanent magnets 9 extending from the de-magnetization side against armature reaction to a part of the magnetization side are arranged on the inner periphery of the yoke 7 in peripheral contact with the auxiliary poles 8. The field magnets including the other pair of magnetic poles 40 and 40a arranged adjacently to the first pair of magnetic poles 30 and 30a, on the other hand, include no permanent magnets but only the auxiliary magnetic poles 8a arranged on the magnetization side of armature reaction at a peripheral angle of $\theta_2$ larger than the peripheral angle $\theta_1$ of the auxiliary poles 8. Numeral 10 designates a brush, and numeral denotes fixing bolts of magnetic material for fixing the end brackets 6a, 6b, which bolts are passed between the magnetic poles 30 and 40a and between the magnetic poles 30a and 40, respectively, that is, between the auxiliary poles 8 and 8a.

Figure 3:
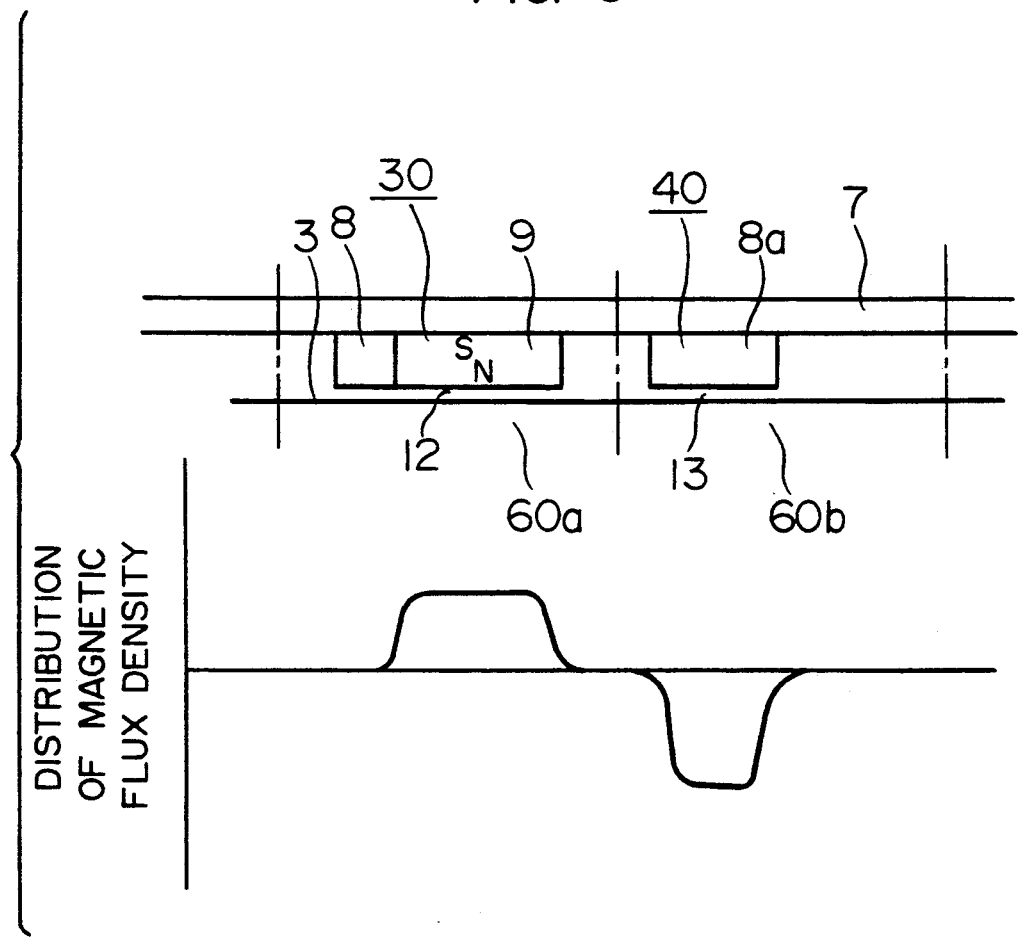
FIG. 3 is a diagram showing the distribution of magnetic flux density in the peripheral direction under no load in FIG. 1.

In this embodiment with magnetic poles arranged alternately with each other, the magnetic flux from the permanent magnet 9 of the magnetic pole 30 are passed through a gap 12 to the rotor 60a as shown in the magnetic flux density distribution diagram of FIG. 3 under a no load state where no armature current flows. Further, the magnetic flux reaches the rotor 60b of the adjacent magnetic pole 40, and through a gap 13 of the magnetic pole 40, is distributed to the auxiliary pole 8a, and then returns to the permanent magnet 9. (Magnetic flux is also distributed to the auxiliary pole 8a of the adjacent magnetic pole 40a from the permanent magnet 9 though not shown.) As a result, the magnetic flux from the permanent magnets 9 of the first pair of magnetic poles 30 and 30a represents an amount thereof for four poles, so that the amount of magnetic flux for each pole is one half of the amount generated by a single permanent magnet 9.

Figure 4:
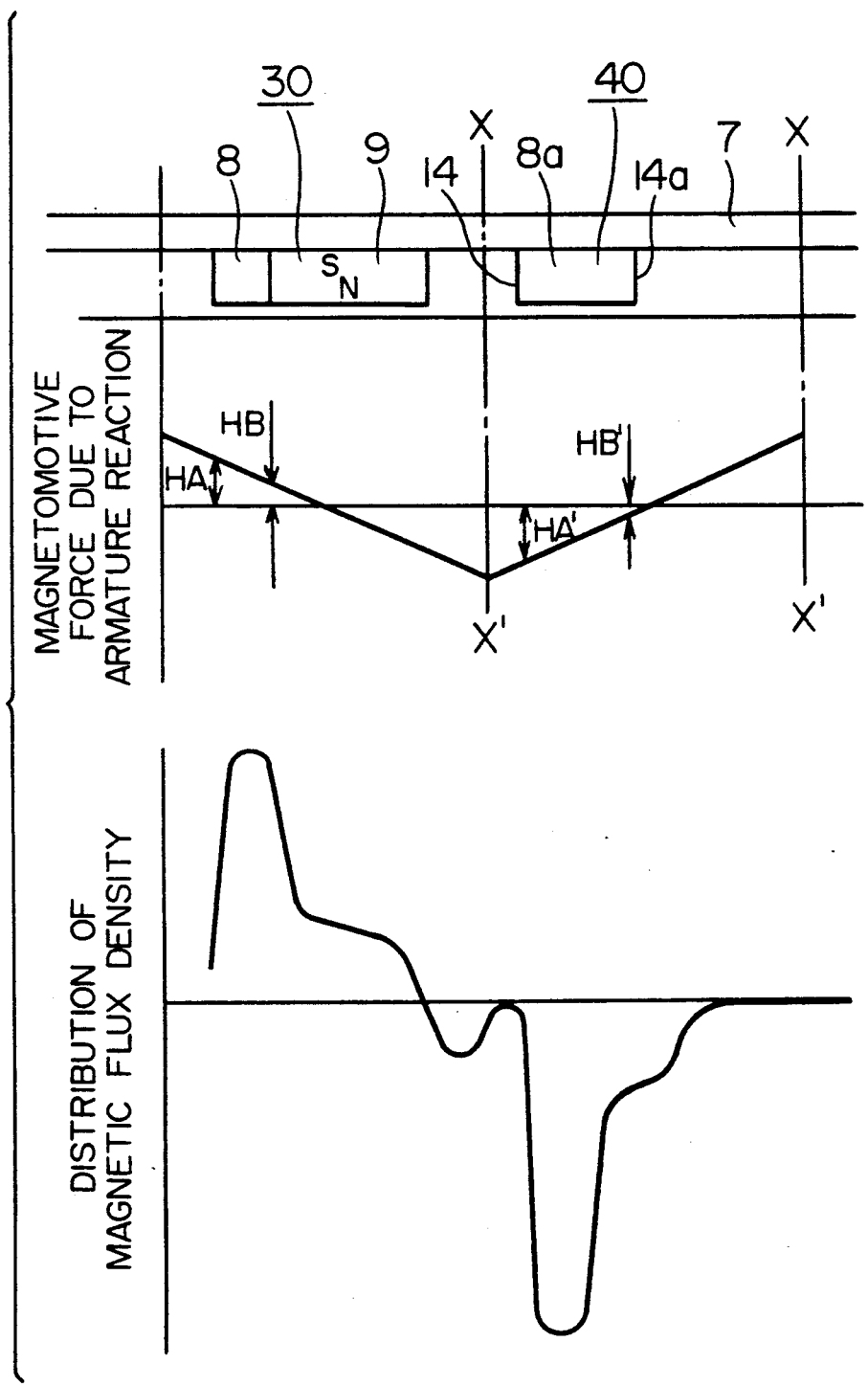
FIG. 4 is a diagram showing the distribution of magnetomotive force of an armature reaction and the distribution of magnetic flux density of field magnetic poles at the time of start in FIG. 1.

FIG. 4 shows the distribution of magnetomotive force due to armature reaction and the distribution of magnetic flux density in the surface of field magnets at the time of start involving a large armature current. Upon energization of the armature coil 4 through the brush 10, the magnetomotive force due to armature reaction is exerted on the field magnets. In the case where the armature current flows toward this side of the page therethrough in the magnetic pole 30, the magnetomotive force due to the armature reaction assumes the forces $H_A$, $H_B$ exerted on the auxiliary pole 8 of the magnetic pole 30 as a magnetization force. If the armature current flows toward the other side through the page in the magnetic pole 40, on the other hand, the magnetization force due to the armature reaction is also exerted on the auxiliary pole 8a. This auxiliary pole 8a has a magnetization end 14 thereof extended along an electrically neutral axis X-X', and therefore is subjected to the magnetization force of armature reaction as shown by $H_A'$ and $H_B'$ in FIG. 4. Especially, in view of the fact that the magnetomotive force $H_A'$ of the magnetization end 14 is larger than $H_A$ of the auxiliary pole 8 of the magnetic pole 30, a large magnetization effect is obtained at the auxiliary pole 8a as compared with the auxiliary pole 8 at the time of start, resulting in a large amount of magnetic flux. This leads to a large average value of magnetic flux of auxiliary pole for each field magnet which is obtained by adding the values for the auxiliary pole 8 of the first pair of magnetic poles 30, 30a and the other pair of magnetic poles 40, 40a. Further, the auxiliary pole 8a of the magnetic pole 40 (like the auxiliary pole 8a of the magnetic pole 40a) not only exerts the above-mentioned magnetization effect but also allows the magnetic flux of the permanent magnet 9 to pass under no load, under load or at the time of start. (The auxiliary pole 8a of the magnetic pole 40a has also the same effect.) Since the auxiliary pole 8a has the magnetization end 14 thereof extended along an electrically neutral axis and has the other end 14a also extended almost to the center of the magnetic pole with the peripheral angle thereof as large as $\theta_2$, however, the sectional area of magnetic flux path thereof is large. As a result, the magnetic flux of the permanent magnet and auxiliary pole is passed without saturation of the magnetic path thereof. Furthermore, the large peripheral angle of $\theta_2$ permits the magnetic flux to be distributed widely in peripheral direction as shown in FIG. 4, thereby being exerted on the armature coil under the magnetic pole 40.

Figure 5:
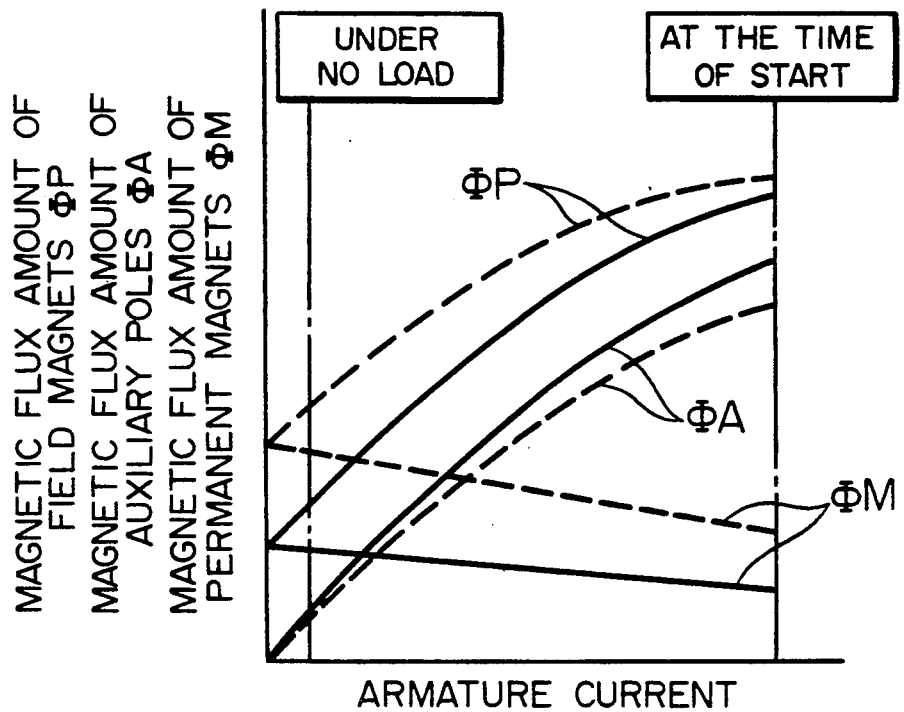
FIG. 5 is a diagram showing the amount of magnetic flux at field magnets versus the armature current.
Figure 6:
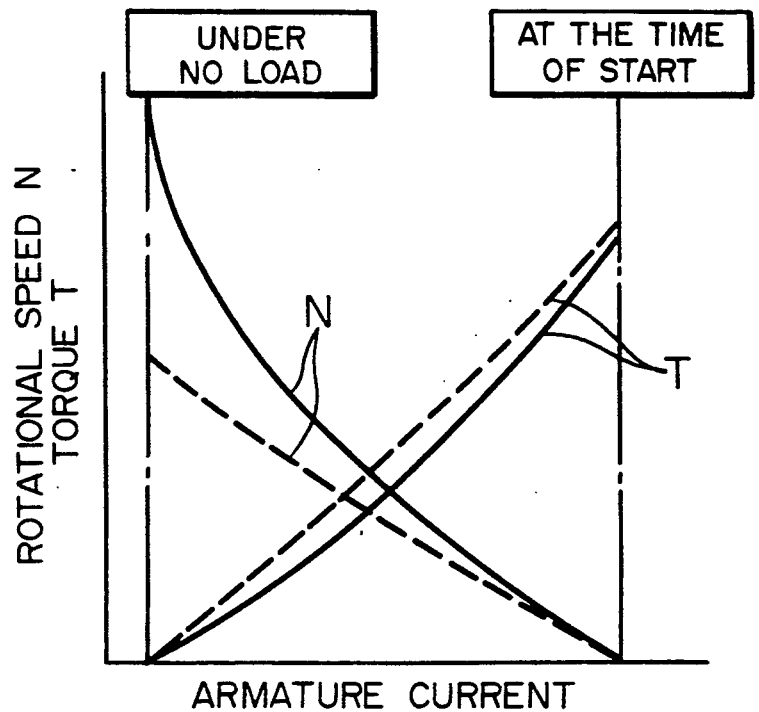
FIG. 6 shows the characteristics of torque and rotational speed versus the armature current.

The amount of magnetic flux for a field magnet (one pole) versus the armature current is shown in FIG. 5. The amount of magnetic flux $\Phi_M$ of the permanent magnet according to the present invention as indicated by the solid line is about one half that of the prior art. Consequently, when the machine is under no load where the armature current is small, the amount of magnetic flux according to the invention is about one half that of the prior art. With the increase in the armature current, a large magnetomotive force due to armature reaction is exerted in the configuration according to the present invention in which the magnetization end 14 of the auxiliary pole is extended along the electrically neutral axis, so that the average amount of magnetic flux $\Phi_A$ of the auxiliary pole per magnetic pole takes a large value as compared with the prior art. As a result, at the time of start where a large armature current flows, the amount of magnetic flux $\Phi_P$ for each pole including a permanent magnet and an auxiliary pole is almost equal to that for the prior art. As shown in the characteristics diagram of FIG. 6, therefore, according to the present invention as shown by the solid line, a torque equivalent to the prior art is obtained at the time of start, while the no-load rotational speed is greatly increased, thereby producing a series characteristic suitable for the starter motor.

The bolts 11 of magnetic material for fixing the end brackets according to an embodiment of the present invention, on the other hand, are assembled through a wide space between the auxiliary poles 8 and 8a, that is, a portion where no permanent magnet is arranged. This space lacks a permanent magnet as mentioned above, and therefore does not attract the magnetic fixing bolts, thereby facilitating the assembly work.

Although the present invention is described with reference to a four-pole machine, the present invention is also applicable to a two-, six- or eight-pole machine with equal effect. Specifically, in a multi-pole machine, each of one half of the poles is made up of a permanent magnet and an auxiliary pole, while each of the other half of magnetic poles is comprised of only an auxiliary pole, which are arranged alternately with each other.

Figure 7:
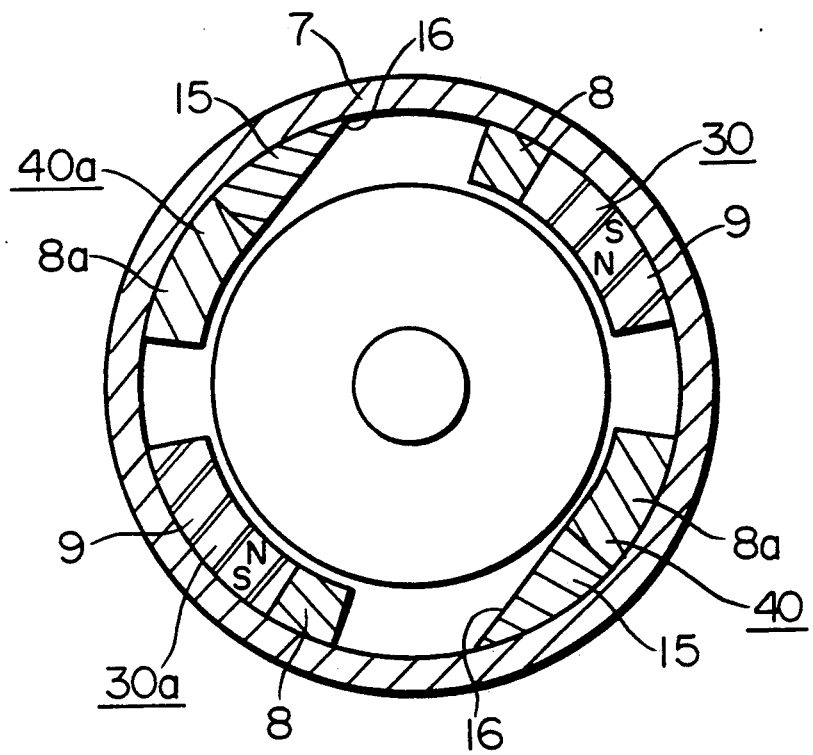
FIGS. 7 to 10 are diagrams showing other embodiments of the present invention.

FIG. 7 shows a field magnet construction in which the auxiliary poles 8a of the magnetic poles 40 and 40a are configured with a peripheral angle of $\theta_2$ similar to FIG. 1, and a magnetic pole segment 15 juxtaposed with the radial thickness thereof progressively decreased in the peripheral direction from the center of the magnetic pole toward the de-magnetization side of the armature reaction. Since the gap between the magnetic pole segment and the armature core is widened progressively from the magnetic pole center toward the de-magnetization end 16, no shorting magnetic flux is generated by armature reaction. Also, in view of the fact that the magnetic pole segment 15 distributes the magnetic flux of the permanent magnet 9 and the auxiliary pole 8a from the magnetic pole center to the de-magnetization side, on the other hand, the magnetic flux is also exerted on the armature coil arranged on the de-magnetization side, thereby assuring an even larger motor torque at the time of starting. Further, the magnetic pole segment 15 is capable of relaxing the magnetic saturation In FIGS. 1 and 7, if the gap between the auxiliary poles 8a of the magnetic poles 40, 40a and the armature core is formed smaller than the gap between the magnetic poles 30, 30a and the armature core, the consumption of the magnetomotive force in the gap between the auxiliary poles 8a and the armature core is reduced. Further, in inserting the rotor into the stator in assembly work, this configuration with the gap of the permanent magnet 9 larger than that of the auxiliary poles prevents the rotor from being attracted by the permanent magnet and the permanent magnet from being broken.

Figure 8:
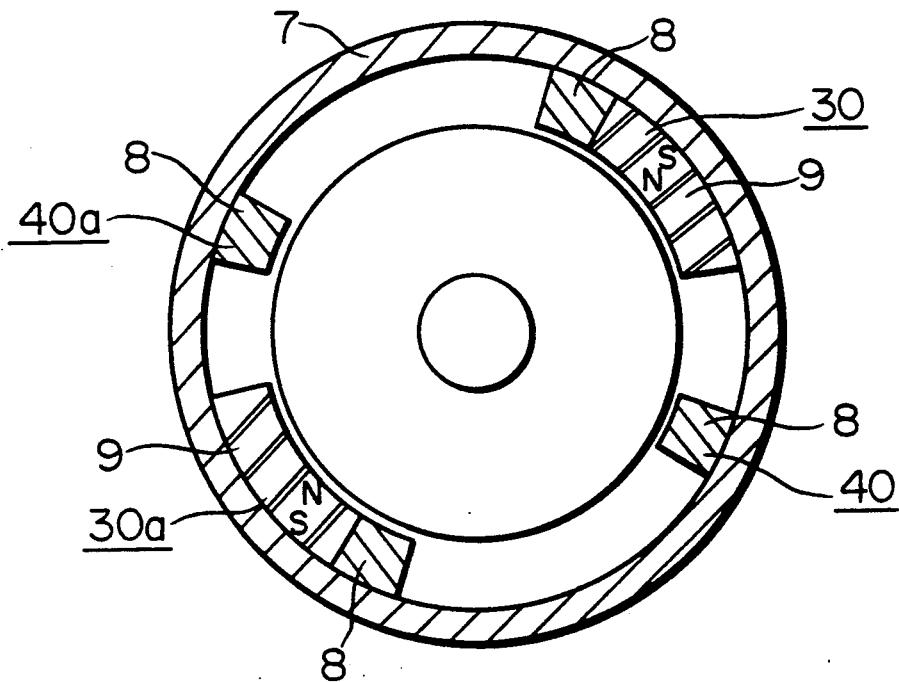

FIG. 8 shows a configuration in which the first pair of magnetic poles 30 and 30a is constructed in the same manner as in FIG. 1, while the auxiliary poles 8a of the other pair of magnetic poles 40, 40a are constructed with the same peripheral angle as the auxiliary poles 8 of the first magnetic pole pair. By doing so, in spite of some reduction in the starting torque, the amount of the permanent magnet is reduced for a greatly decreased amount of no-load magnetic flux thereby to increase the no-load rotational speed.

Figure 9:
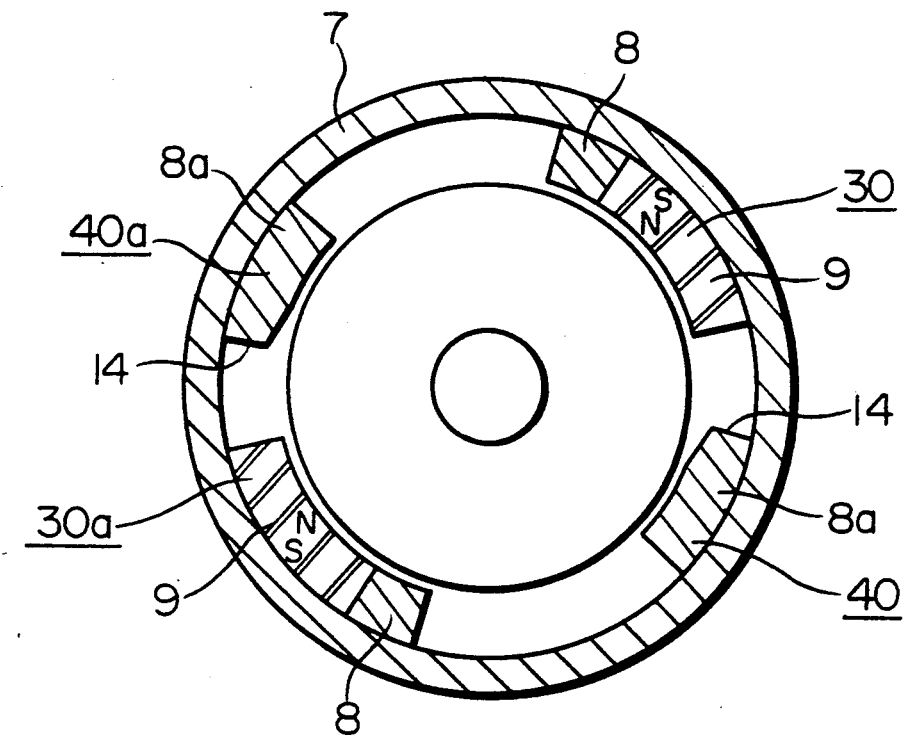

As shown in FIG. 9, the radial thickness of the magnetization end 14 of the auxiliary poles of the magnetic poles 40, 40a may be progressively reduced to widen the gap with the armature core. In this way, the distribution curve of the magnetic flux density in the vicinity of the magnetization end is made gentle, thereby reducing the vibrations and noise.

Figure 10:
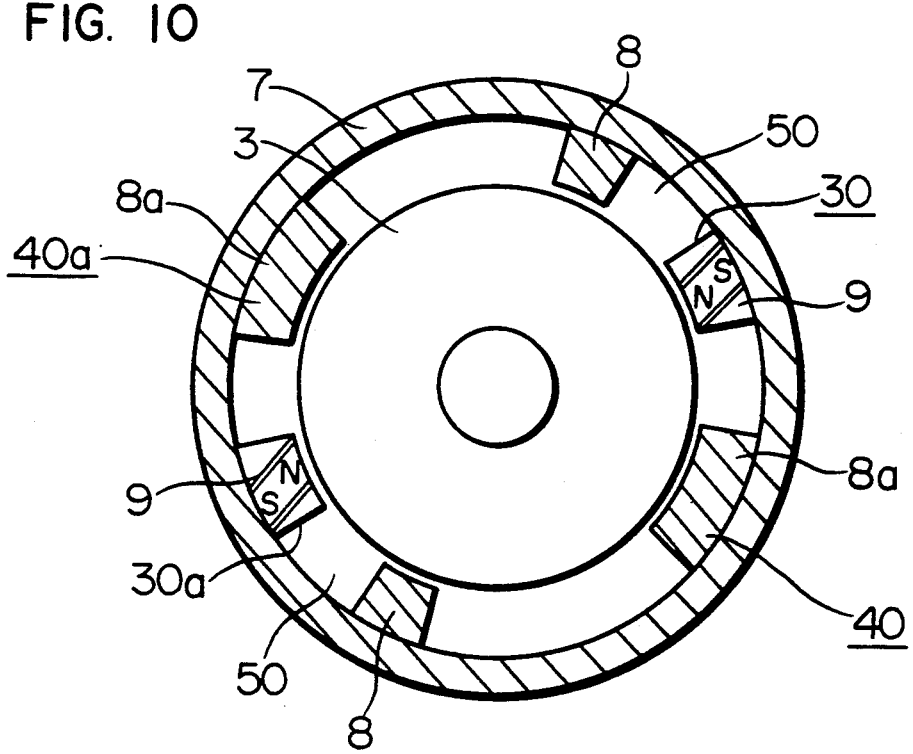

As shown in FIG. 10, on the other hand, the permanent magnets 9 of the magnetic poles 30 and 30a are not necessarily in contact with the auxiliary poles 8 in the peripheral direction, but a gap 50 may be formed to arrange the permanent magnet 9 in a part of the de-magnetization side of armature reaction. This arrangement saves the required amount of the permanent magnet.

It will thus be understood from the foregoing description that according to the present invention the amount of no-load magnetic flux is greatly reduced while producing a great amount of magnetic flux at the time of starting, thereby producing series characteristics suitable for the starter motor with a large starting torque. Further, permanent magnets are arranged only for half of the magnetic poles to form field magnets, and therefore the amount of material used for permanent magnets is saved, leading to a low-cost field magnet. Furthermore, in view of the fact that the motor is assembled with end bracket-fixing bracket fixing bolts passed between the auxiliary poles, the fixing bolts of magnetic material are not attracted to the permanent magnets to facilitate the assembly work. In addition, a configuration with a large peripheral angle of the other pair of magnetic poles and a high heat conductivity of the magnetic material of the auxiliary poles permit the heat generated in the armature to conduct to the yoke through the auxiliary poles, thereby improving the cooling performance.

We claim:

1. A DC rotary electric machine of permanent magnet type, comprising a yoke, a stator including a plurality of field magnets fixed on the inner periphery of said yoke, a rotor including an armature core arranged in opposed relationship with said field magnets and an armature coil arranged in the vicinity of the outer periphery of the armature core, and commutation means for supplying current to said rotor, wherein each of a predetermined number of the plurality of field magnets of the stator includes a permanent magnet and an auxiliary pole of magnetic material, and each of the remaining field magnets of the plurality of field magnets includes only an auxiliary pole made of a magnetic material, wherein the predetermined number of field magnets made up of a permanent magnet and an auxiliary pole have the auxiliary pole thereof arranged on a magnetization side of an armature reaction, and a peripheral angle of said auxiliary pole is smaller than that of the remaining field magnets made up only of an auxiliary pole, and wherein a magnetization end of the remaining field magnets made up only of an auxiliary pole is arranged more proximate to an electrically neutral axis of the rotary electric machine than a de-magnetization end of the predetermined number of field magnets including a permanent magnet and an auxiliary pole.

2. A DC rotary electric machine of permanent magnet type, comprising a yoke, a stator including a plurality of field magnets fixed on the inner periphery of said yoke, a rotor including an armature core arranged in opposed relationship with said field magnets and an armature coil arranged in the vicinity of the outer periphery of the armature core, and commutation means for supplying current to said rotor, wherein each of a predetermined number of the plurality of field magnets of the stator includes a permanent magnet and an auxiliary pole of magnetic material, and each of the remaining field magnets of the plurality of field magnets includes only an auxiliary pole made of a magnetic material, wherein a magnetic pole segment of a magnetic material having a radial thickness thereof progressively decreasing in a peripheral direction is arranged at a de-magnetization end of each of the remaining field magnets made up only of an auxiliary pole.

* * * * *